(12) United States Patent
Chau

(10) Patent No.: US 9,340,326 B2
(45) Date of Patent: May 17, 2016

(54) FILM WITH OXYGEN ABSORBING REGIONS

(71) Applicant: Multisorb Technologies, Inc., Buffalo, NY (US)

(72) Inventor: Chieh-Chun Chau, Victor, NY (US)

(73) Assignee: Multisorb Technologies, Inc., Buffalo, NY (US)

( * ) Notice: Subject to any disclaimer, the term of this patent is extended or adjusted under 35 U.S.C. 154(b) by 0 days.

(21) Appl. No.: 14/148,334

(22) Filed: Jan. 6, 2014

(65) Prior Publication Data

US 2014/0161376 A1    Jun. 12, 2014

Related U.S. Application Data

(63) Continuation of application No. 13/370,995, filed on Feb. 10, 2012, now Pat. No. 8,623,481.

(51) Int. Cl.
| | |
|---|---|
| *B65D 33/04* | (2006.01) |
| *B29C 47/00* | (2006.01) |
| *B29C 47/06* | (2006.01) |
| *B29C 47/14* | (2006.01) |
| *B29C 47/30* | (2006.01) |
| *B32B 3/18* | (2006.01) |
| *B32B 5/14* | (2006.01) |
| *B32B 27/08* | (2006.01) |
| *B32B 27/18* | (2006.01) |

(52) U.S. Cl.
CPC ............ *B65D 33/04* (2013.01); *B29C 47/0021* (2013.01); *B29C 47/0033* (2013.01); *B29C 47/062* (2013.01); *B29C 47/145* (2013.01); *B29C 47/30* (2013.01); *B32B 3/18* (2013.01); *B32B 5/142* (2013.01); *B32B 27/08* (2013.01); *B32B 27/18* (2013.01); *B32B 2307/412* (2013.01); *B32B 2307/74* (2013.01); *B32B 2439/00* (2013.01); *Y10T 428/131* (2015.01); *Y10T 428/1334* (2015.01); *Y10T 428/1341* (2015.01); *Y10T 428/1352* (2015.01); *Y10T 428/23* (2015.01); *Y10T 428/24752* (2015.01); *Y10T 428/24851* (2015.01)

(58) Field of Classification Search
CPC ............ B32B 3/02; B32B 27/18; B32B 1/02; B29C 47/06; Y10T 428/1352; Y10T 428/1355
See application file for complete search history.

(56) References Cited

U.S. PATENT DOCUMENTS

| | | | |
|---|---|---|---|
| 3,580,413 A | 5/1971 | Quackenbush | |
| 5,207,943 A | 5/1993 | Cullen et al. | |
| 5,667,863 A | 9/1997 | Cullen et al. | |

(Continued)

FOREIGN PATENT DOCUMENTS

| | | |
|---|---|---|
| EP | 0370802 | 5/1990 |
| JP | 04121277 | 4/1992 |

(Continued)

OTHER PUBLICATIONS

Office action for U.S. Appl. No. 13/370,995, mailed on May 13, 2013, Chau, "Film With Oxygen Absorbing Regions", 6 pages.

(Continued)

*Primary Examiner* — Michael C Miggins
(74) *Attorney, Agent, or Firm* — Lee & Hayes, PLLC

(57) ABSTRACT

A packaging material includes an oxygen scavenger material dispersed in bands in a polymer sheet.

20 Claims, 6 Drawing Sheets

(56) References Cited

U.S. PATENT DOCUMENTS

| | | |
|---|---|---|
| 2002/0001686 A1 | 1/2002 | Kashiba et al. |
| 2007/0154683 A1 | 7/2007 | Ausen et al. |
| 2008/0008848 A1 | 1/2008 | Dick et al. |
| 2013/0022812 A1 | 1/2013 | Powers et al. |
| 2013/0209713 A1 | 8/2013 | Chau |

FOREIGN PATENT DOCUMENTS

| | | |
|---|---|---|
| JP | 2007135509 | 6/2007 |
| WO | WO9611861 | 4/1996 |
| WO | WO2009029350 | 3/2009 |
| WO | WO2012017984 | 2/2012 |

OTHER PUBLICATIONS

The Australian Office Action mailed Jun. 6, 2015 for Australian application No. 2013216845, a counterpart foreign application of U.S. Appl. No. 13/370,995, 3 pages.

The Canadian Office Action mailed Jul. 31, 2015 for Canadian patent application No. 2,863,688, a counterpart foreign application of U.S. Pat. No. 8,623,481, 3 pages.

The Japanese Office Action mailed Aug. 5, 2015 for Japanese patent application No. 2014-556734, a counterpart foreign application of U.S. Pat. No. 8,623,481, 8 pages.

The Extended European Search Report mailed Oct. 23, 2015 for European patent application No. 13746590.2, 5 pages.

FILM WITH OXYGEN ABSORBING REGIONS

CROSS-REFERENCE TO RELATED APPLICATIONS

This Application is a continuation of U.S. patent application Ser. No. 13/370,995, filed Feb. 10, 2012, which issued as U.S. Pat. No. 8,623,481 on Jan. 7, 2014, the entire disclosure of which is incorporated herein by reference.

FIELD OF THE INVENTION

This invention relates to a packaging material that includes an oxygen scavenger material dispersed in bands in a polymer sheet. In particular it is directed to such a polymer sheet utilized in forming packages.

BACKGROUND OF THE INVENTION

Flexible packaging sheeting is known to be utilized to form bags and standup pouches and is broadly used in the medical, food packaging and food service industries. Conventional bags and pouches used in food packaging usually contain barrier resins and are cosmetically decorated. Materials for making these containers can be polyolefins, polystyrene, nylon, polyester, and biopolymers such as polylactic acid. The structure of these materials usually is multilayer and may include an oxygen barrier material such as polyethylene vinyl alcohol (EVOH), polyethylene terephthalate, polyvinylidene chloride (PVDC), and nylon. The bags are designed to maintain freshness of the food or medicine in the bag. A common way to improve the freshness of a meat package is to put oxygen absorber in a sachet in the meat package (U.S. Publication No. 2011-0217430-Chau). It is desirable to avoid the use of sachets in many loose food products as they may become ingested or broken after the package is opened. It is known to put oxygen absorber on an adhesive label that is on the inside of a package.

While the techniques of utilizing an inner label for oxygen absorption or a sachet are reasonably effective they have the disadvantage that they are relatively high cost as each requires an extra step in forming a package and additionally another material formation process to make the label or sachet. There is need for a package that does not require the additional step of providing oxygen absorber into the package formed of polymer sheet, but also provides a package that has large areas of transparent polymer so that the end-user can see the material in the package.

DESCRIPTION OF RELATED ART

It is shown in U.S. Publication No. 2011/0217430-Chau that oxygen scavenger may be placed into a foam sheet for use in packaging meat.

U.S. Pat. No. 5,820,956-Hatakeyama discloses a multilayer structural material including an oxygen absorber that may be utilized in forming packaged goods.

U.S. Publication No. 2010/0255231-Chau discloses an oxygen scavenging film assumed for use in making bags or pouches.

U.S. Pat. No. 5,045,264-Kirksey discloses a method and apparatus for making extruded plastic polymer film with strips embedded therein of a second thermoplastic material.

U.S. Pat. No. 5,687,863-Cullen and U.S. Pat. No. 5,686,161-Cullen et al. disclose a label containing oxygen scavenger which may be placed on the inside of a package.

Problem to be Solved by the Invention

There is a need for an oxygen absorbing package that may be formed utilizing known package-making apparatus and processes without extra steps for providing the oxygen absorption. There also is a need for an oxygen absorbing packaging sheet that will enable the making of a package having transparent viewing areas.

BRIEF SUMMARY OF THE INVENTION

The invention relates to a packaging material which includes a continuous polymer sheet wherein said sheet includes at least one longitudinal band of oxygen absorber.

In another embodiment of the invention a package utilizing a portion of the continuous polymer sheet with a band of oxygen absorber is formed.

Advantageous Effect of the Invention

The invention provides a package with oxygen absorbing areas and transparent areas that may be made from one sheet of film by ordinary packaging forming methods which involve folding a sheet to form a package and sealing the edges of the folded materials together.

BRIEF DESCRIPTION OF THE SEVERAL VIEWS OF THE DRAWING(S)

DETAILED DESCRIPTION OF THE INVENTION

The present invention has numerous advantages over prior processes and products. The invention provides a continuous strip of material containing longitudinal bands of oxygen absorber between and separated by transparent areas. The continuous strip may be utilized in conventional bag and pouch making machines to form a pouch or bag that has oxygen absorbent properties but still allows transparent areas for viewing of a product in the pouch or bag. Present processes to form oxygen absorbent pouches and bags require a separate step to place a sachet into the bag or a label onto the bag to provide oxygen absorbent properties. Previous materials with oxygen absorbers throughout the lateral width of a sheet could be formed into oxygen absorbent pouches and bags but the bags did not have transparent areas. The bags without transparent areas are not desirable for many foods where the customer likes to see the food. Therefore, the instant invention provides significant advantages in a formation technique that results in lower cost and a much improved product design. With the invention bags and pouches no consideration need to be given to sachets being ingested with the contents of the bag. Further, there is no concern about oxygen absorbent labels coming detached and mixing with the contents of the bag. Further, as above stated, labels and sachets are not necessary thereby resulting in significant cost savings. By varying the width of the bands of oxygen absorber in the package forming sheet the amount of oxygen absorption available may be matched to the particular product being packaged. This avoids waste of the oxygen absorber material thereby lowering cost. These and other advantages will be apparent from the detailed description and drawings.

Figure 1:
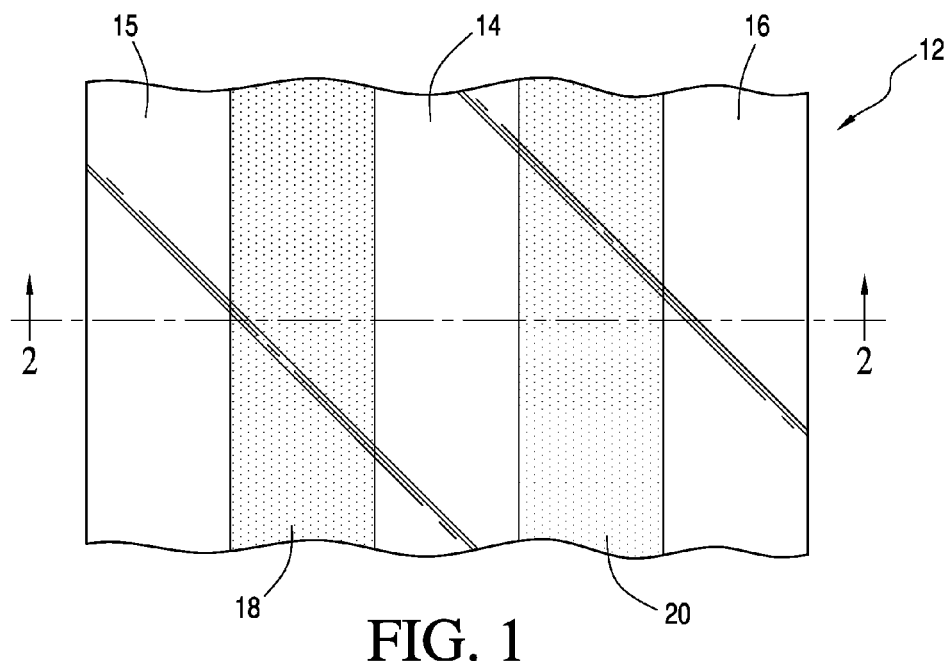
FIG. 1 is a top view of a portion of a continuous sheet having the oxygen absorbing bands of the invention.

In FIG. 1 is shown an overhead view of a continuous banded film or sheet 12 that has bands of transparent areas 14, 15, and 16. The sheet 12 also has bands of oxygen absorbing areas 18 and 20. As utilized herein continuous sheet or continuous film generally refers to a sheet that has a length in a longitudinal direction greater than its width in the transverse direction. In some application, the sheet or film may be longer than 1000 feet in the longitudinal direction. A typical length of continuous sheets is between 5,000 and 10,000 feet for smaller packaging runs. Generally sheets of material for packaging have a preferred length of between about 5,000 and about 20,000 feet, for economical sheet formation, printing, and package formation with long runs. A continuous sheet or film is generally cut one or both of longitudinally and transversely to form packaging blanks, which are used to form individual packages. The invention is directed to both the continuous films and to individual blanks for making packages, as will be described in more detail below. When the term "oxygen absorbing band" is utilized in this application it is intended to mean the longitudinal stripes formed by the addition of oxygen absorber to a longitudinal portion of a continuous sheet. It may also be used to refer to a portion of the oxygen absorbing band cut from the continuous sheet. In package formation "stripe" may be used to identify a piece cut from the continuous band. Generally, the oxygen absorbing areas are not transparent but are gray and translucent having the ability to pass between 25 and 85% of visible light through the sheet. The areas between the oxygen absorbing bands are generally transparent having an ability to pass greater than 90% and preferably greater than 95% of the visible light applied to the transparent band.

Figure 2:
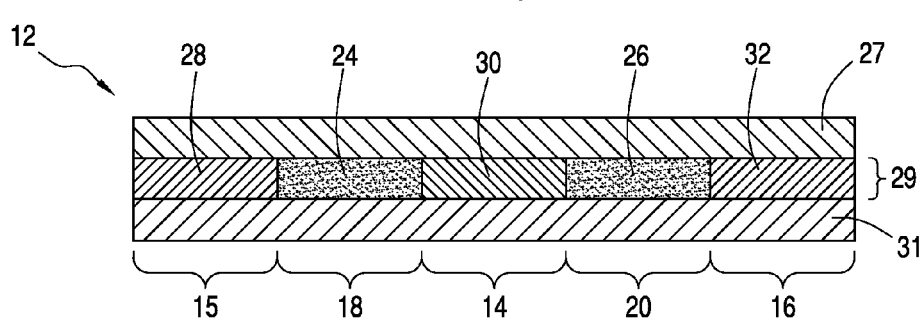
FIG. 2 is a cross-sectional view taken along line 2-2 of FIG. 1 in one embodiment of the invention.

In FIG. 2, a cross-section along line 2-2 of FIG. 1, there is shown a three layer structure including outer layers 27, 31 and an inner layer 29. In this embodiment the inner layer 29 has oxygen absorbing portions 24, 26 and transparent portions 28, 30, 32, to form the oxygen absorbing bands 18, 20, and the transparent bands 14, 15, 16 of the sheet 12. The outer layers 27, 31 are applied to opposite faces of the inner layer 29 to form the three layer structure. The outer layers 27, 31 preferably are transparent and printable, as will be described in more detail below. In one embodiment, the three layers 27, 29, 31 are coextruded, but in still other embodiments two or more of the layers could be laminated after formation. Other techniques for forming multi-layer structures will be appreciated by those having ordinary skill in the art and are within the scope of the invention.

Figure 2A:
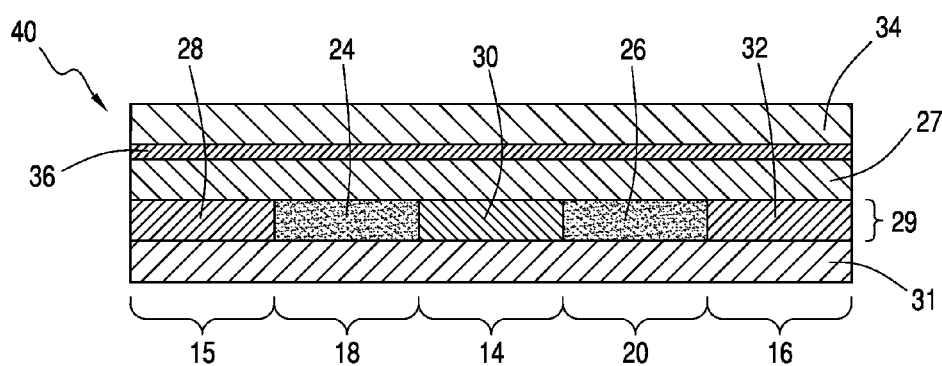
FIG. 2A is a cross-sectional view taken along line 2-2 according to another embodiment of the invention.

The three layer structure of FIGS. 1 and 2 generally would be formed into a sheet suitable for package formation by adhering the sheet 12 to a preformed oxygen barrier material such as a film that contains ethylene vinyl alcohol (EVOH). FIG. 2A illustrates such a packaging sheet 40 having an EVOH sheet 34 attached to the sheet 12. The oxygen barrier layer may be attached to the sheet 12 utilizing a tie layer 36 which will allow secure attachment of the sheets of polyethylene and ethylene vinyl alcohol to each other. Generally, the layer containing the oxygen barrier material is shielded from the inside of the package by an oxygen permeable layer, such as layer 31. Shielding the oxygen absorber layer from the package contents prevents the contamination of the oxygen absorbent material, such as iron, by material in the package and also contamination of food material in the package. The oxygen barrier sheet 34 may be attached during formation of the banded sheet such that it is coextensive with the continuous banded film 12 to form packaging sheet 40. The oxygen barrier sheet it will be understood may be comprised of several layers of material that may provide properties such as strength or printability in addition to oxygen barrier properties.

Figure 3:
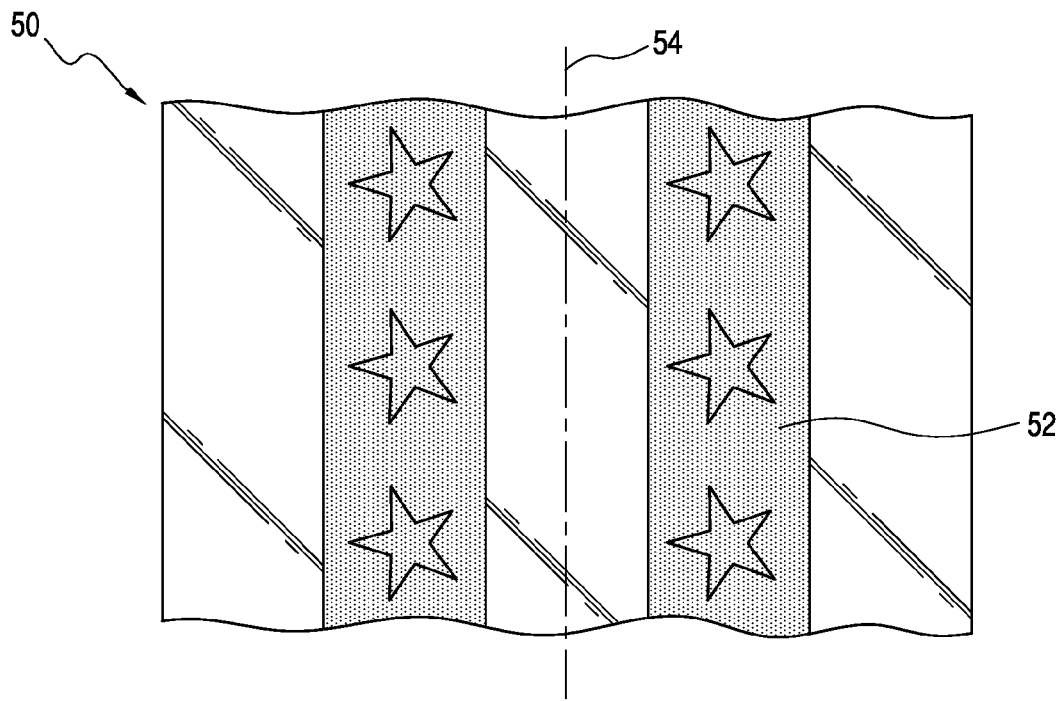
FIG. 3 is a top view of the sheet of FIG. 1 having printing over the oxygen absorbing bands.
Figure 4:
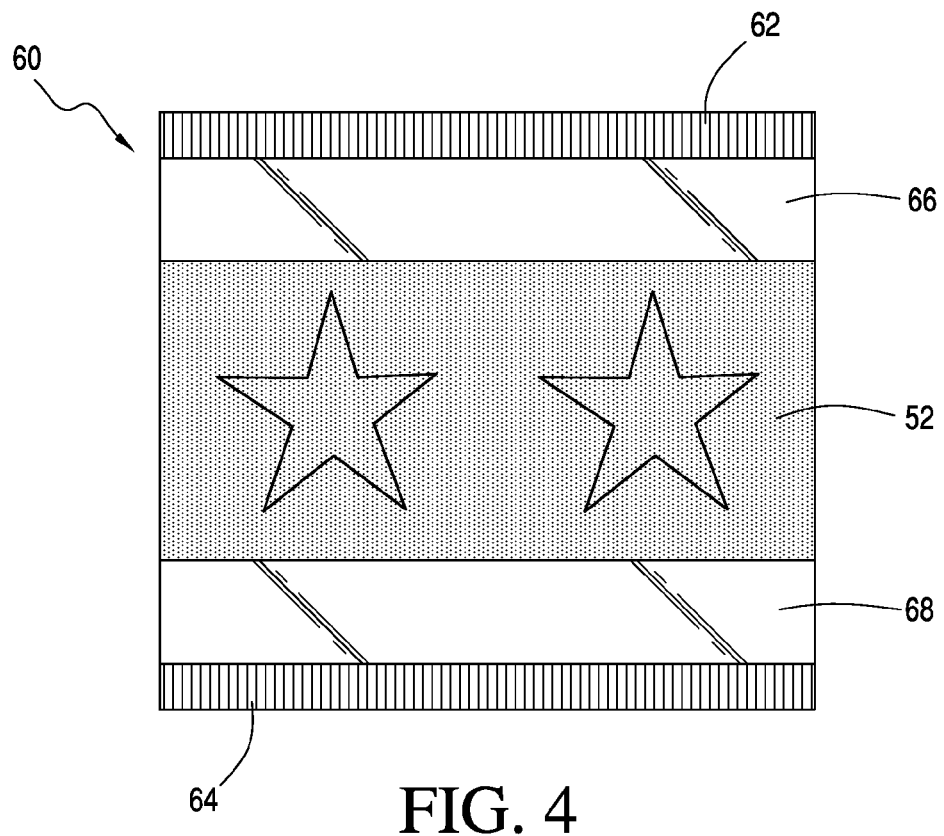
FIG. 4 is a view of a package formed from a portion of the sheet of FIG. 3.

In FIG. 3 is illustrated packaging film 50 which consists of the packaging film 40 with printing 52 over the areas 24, 26 of the continuous packaging film that contain oxygen absorbent. The areas 66 and 68 are transparent and will, after package formation, allow the consumer to view the contents of the package. The areas of oxygen absorbent will be translucent and after printing the color and transparency of the film in the printed areas is not apparent to the observer. The printing does not need to only coincide with the areas over the oxygen absorber and may extend into the transparent areas as necessary to form a pleasing design for the package. The sheet 50 may, depending on its width, be cut into several pieces transversely and longitudinally, and then folded to form packages. The film also could be utilized as a cover for the open top of a tray containing food or medicine. It also could be used as a wrap for a pre-existing oxygen permeable package that did not have oxygen barrier properties. In FIG. 4, the package 60 is formed of half of packaging sheet 50 that has been cut on line 54 (in FIG. 3). The package is wrapped and sealed on the backside in the known manner for bag formation, not shown, and then sealed at the top 62 and bottom 64 adhesively or by heat and pressure.

Figure 5:
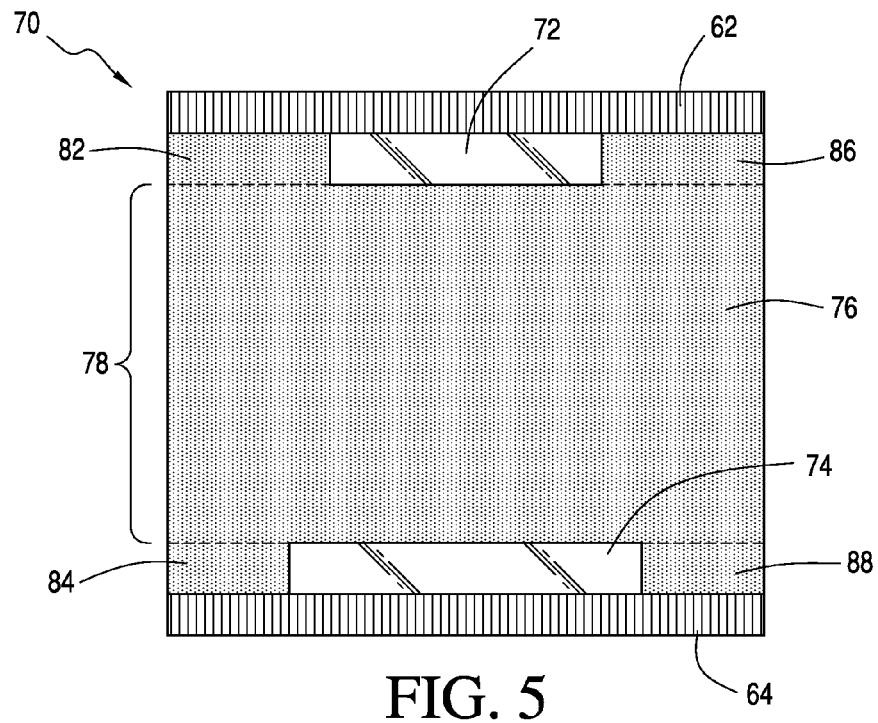
FIG. 5 is a view of a different package formed from a portion of the sheet of FIG. 3.

Illustrated in FIG. 5 is a bag 70 that has transparent areas 72, 74. The printing area 76 overlaps the oxygen barrier area 78 and also onto transparent areas 82, 84, 86, and 88. This package utilizes a greater area for printing and provides smaller windows for observing the product.

Figure 6:
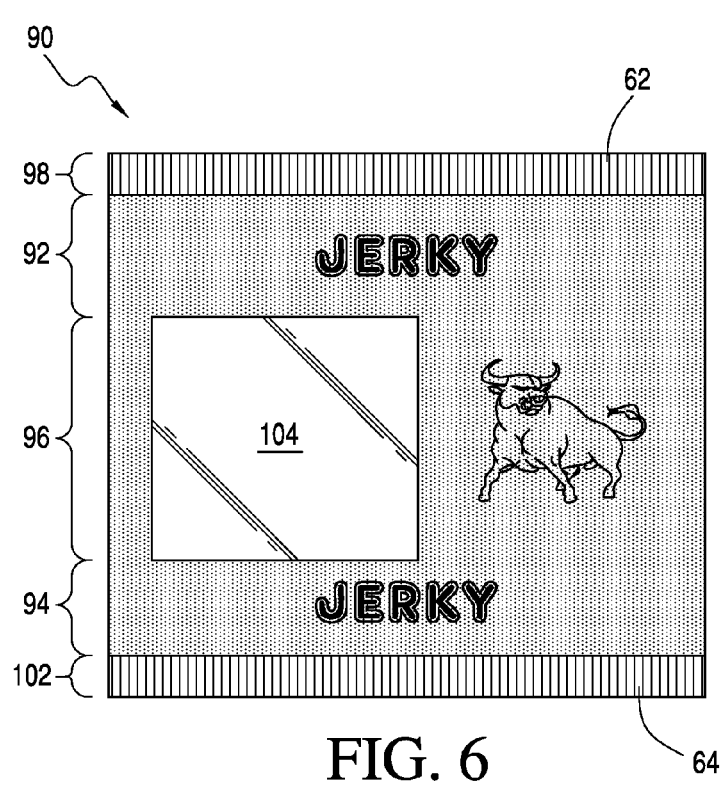
FIG. 6 is a view of a package, having a transparent window, formed in accordance with the invention.

Illustrated in FIG. 6 is a bag 90 that is provided with oxygen absorbing bands 92, 94. The transparent areas 96, 98, 102 are transparent. The transparent areas 98, 102 have been utilized for the seals 62, 64. Printing as been carried out in the entire packaging sheet used to form the package except for window 104 where the product may be observed in a central portion of the bag.

Any suitable oxygen scavenger may be utilized in the invention. Typical oxygen scavengers are sulfur dioxide, chelates of salicylic acid or a salicylate salt. Other suitable oxygen scavenger materials are salts or chelates of metals such as zinc, copper, aluminum, and tin. Iron oxygen scavengers are preferred in many application because they are effective and low in cost.

A most preferred oxygen scavenger is reduced iron powder coated with activating and acidifying materials. It preferably has 1-25 μm mean particle size, more preferably 1-10 μm mean particle size and most preferably 2-5 μm mean particle size for rapid scavenging and good pore formation. The combination and relative fraction of activating and acidifying components coated onto the iron particles are selected according to the teachings of U.S. Pat. No. 6,899,822, U.A. Patent Application Nos. 2005/0205841 and 2007/0020456, incorporated herein by reference. The coating technique is preferably a dry coating as described in the references above. The current invention may use iron-based powders with a mean particle size of 1-25 μm, where iron particles are pre-coated with activating and oxidation reaction promoter particles to form a homogeneous powder. The sheets or articles produced with the finely dispersed oxygen scavenging particles advantageously possess high reactivity with oxygen. The oxygen scavenging particles disperse well throughout the bands where they are utilized. A preferred embodiment of the iron powder with activating and acidifying ingredients is the dry coated oxygen scavenging particles as disclosed in U.S. Pat. No. 7,951,419 hereby incorporated by reference.

The polymer containing the oxygen scavenger may be any suitable polymer that is permeable to oxygen and readily extruded. Suitable materials include polyolefin such as high density and low density polyethylene and polypropylene and modified forms thereof, polyester such as polyethylene terephthalate, polyamide such as nylon 6 and nylon 66, ethylene-vinyl alcohol copolymer, polyvinyl chloride, styrene-ethylene copolymers, polyester, polyurethane, and polyvinylindene chloride. A preferred material is low density polyethylene as this material is transparent, low in cost, extrudable at relatively low temperatures, and transmits oxygen.

Polymers utilized in the invention may also include biodegradable polymers such as polylactic acid and its copolymers. Other biodegradable polymers include polycaprolactone, thermoplastic starches, cellulose, and polysaccharides.

Packaging materials of the invention also preferably include an oxygen barrier layer. The polymer forming the oxygen barrier layer may be any material that will prevent the transmission of oxygen. Such materials include metallic layers of tin or aluminum and polyvinyl alcohol. A preferred material is ethyl vinyl alcohol (EVOH) as this material is readily available, relatively low in cost, extrudable at polyethylene temperatures, and has very good oxygen barrier properties.

The packaging films of the invention may be extruded as a continuous unitary packaging member with an oxygen barrier layer and layers with bands of oxygen absorbent. Alternatively a continuous oxygen absorber banded extruded sheet may be formed and then laminated with separately formed oxygen barrier layer containing sheet by the use of suitable tie layers to adhesively connect the sheets. The packaging may be printed by printing the barrier layer sheet prior to lamination. It is also possible to print the oxygen banded material after extrusion or laminating.

The continuous packaging sheets of the invention with longitudinal bands of oxygen absorber generally do not require any special packaging as they are self protecting due to the many layers thickness of the roll. The rolls generally have a length of greater than 1,000 feet and the many layers, containing oxygen barrier layers, wrapped on the roll provide protection from oxygen penetration. The rolls of the invention material may be handled as are the rolls of printed packaging material now utilized in the food and medical industry. Normally when the materials are first fed off a roll this leader material is not utilized as it is lost during setup. This top layer material would generally be the only packaging material that might be affected by oxygen in storage.

The following are illustrations of packaging sheets of the invention. In each of the sheets illustrated where the oxygen absorber is indicated the oxygen absorber is in bands separated by bands of transparent low density polyethylene that do not have oxygen absorber present. In all instances the polyethylene is low density polyethylene. The coated iron oxygen absorber is an oxygen scavenger package prepared by coating iron particulates, 4-5 μm mean particle size, with sodium bisulfate and sodium chloride to form a homogeneous coated composite powder having a composition by weight of 80% iron, 10% sodium bisulfate, and 10% sodium chloride.

A three layer coextruded sheet comprising

Polyethylene
Polyethylene plus coated iron oxygen absorber in banded areas
Polyethylene
is laminated, with a tie layer, to a coextruded sheet comprising
Polyethylene
Tie layer
ethylene vinyl alcohol
Tie layer
Polyethylene to form a packaging sheet with oxygen barrier properties and oxygen absorbing properties The sheet would be utilized with the layer comprising the oxygen absorber on the inside of the sheet and printing on the outside of the sheet. The sheet containing the banded oxygen absorber would be about 3 mils thick. The sheet with the oxygen barrier layer would be about 2 mils thick.

Another illustration of the invention packaging material would be a laminate of a two layer coextruded sheet containing the banded oxygen absorber laminated to a five layer structure containing an oxygen barrier layer. The laminated structure would be:

polyethylene
tie layer
ethylene vinyl alcohol polymer
tie layer
Polyethylene
polyethylene and coated iron oxygen absorber
Polyethylene The following illustration of invention is the layer structure of a single step coextruded, oxygen absorber banded, packaging sheet.

Polyethylene
tie layer
ethylene vinyl alcohol
polyethylene and coated iron oxygen absorber
Polyethylene The printing of the packaging films of the invention preferably is carried out by unrolling the oxygen absorbent sheet and printing it by rotogravure or flexographic processes. This allows for printing bright colors and dark colors on the sheet, particularly where the band of oxygen absorber is present. It further would be possible that the oxygen barrier sheet could be printed prior to its being attached to the banded layer of oxygen absorber sheet. It is also possible that the printing of the sheet could be carried out as it is unwound prior to being slit both in the longitudinal and transverse direction to form the blanks from which bags are made or the packaging materials are utilized as coverings for containers.

The amount of iron in the bands of oxygen absorber may be any amount that provides the necessary result in a particular package. Typically the oxygen absorber portion of coated iron oxygen absorber is present in an amount of between 5 and 80% by weight of the polymer layer portion containing the oxygen absorber.

The polymer bags of the invention may be utilized for any package that requires a reduced oxygen atmosphere in the bag. Typical of such materials are food materials such as coffee, fresh meat, beef jerky, pasta, baby food and other moist foods. The packages also may be used for medical products such as pills and replacement body parts which require protection from oxygen. The oxygen absorber is activated by water that comes from the materials packaged such as fresh meat or beef jerky.

The phrase "tie layer" as used in the description of packaging materials of the invention refers to a thin layer utilized to join previously formed sheets in order to form them into laminate. It also refers to layers extruded between dissimilar polymers in an extrusion head in order to bind these polymers. Typical polymers or solvents utilized in tie layers for coextrusion of a polyethylene layer to an ethylene vinyl alcohol layer are maleic anhydride grafted polyethylene or polypropylene_ethylene vinyl acetate and ethylene acrylic acid copolymers. Typical polymers utilized to join layers during coextrusion are commercial resins such as ADMER (Mitsui Chemical) maleic anhydride grafted resin, AMPLIFY (Dow Chemical) functionalized polyethylene and PLEXAR (LyondellBasell) maleic anhydride grafted polythylene. A preferred tie layer polymer for joining ethylene vinyl alcohol and polyethylene during coextrusion is maleic anhydride grafted polyethylene or polypropylene because they give strong bond between EVOH and polyethylene. Generally, the tie layer serves no function in the sheet except to join the layers.

Extrusion heads for extruding the polymer sheets of the invention are known in the art. As is conventionally known, various feedblocks may be used in conjunction with extrusion heads to form desired co-extruded materials. In the present invention, a feedblock receives the different materials to be incorporated into a sheet of material and delivers that material to a die that forms the sheets. For instance it would be known that the bands containing oxygen absorber would need to be made with a resin of lower viscosity as the addition of the particulate iron oxygen absorber would raise the viscosity. It is also known in the art to extrude polymer sheets in widths from only a few centimeters up to more than two meters in width, depending upon the desired packaging. In some embodiments wide polymer sheets are extruded that will be slit both longitudinally and transversely to form blanks for use in forming packages.

Figure 7:
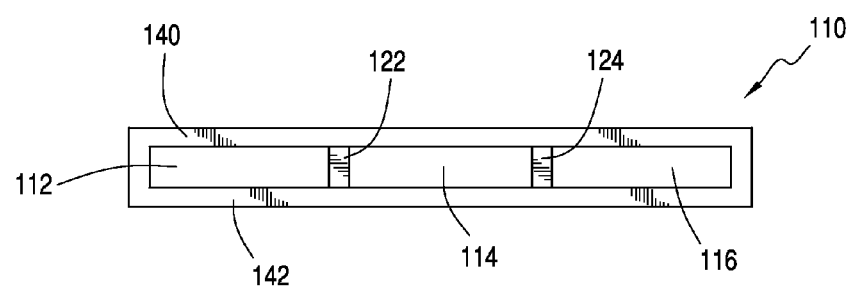
FIG. 7 is an elevation view of an extrusion head suitable for creating a film according to one aspect of the invention.
Figure 7A:
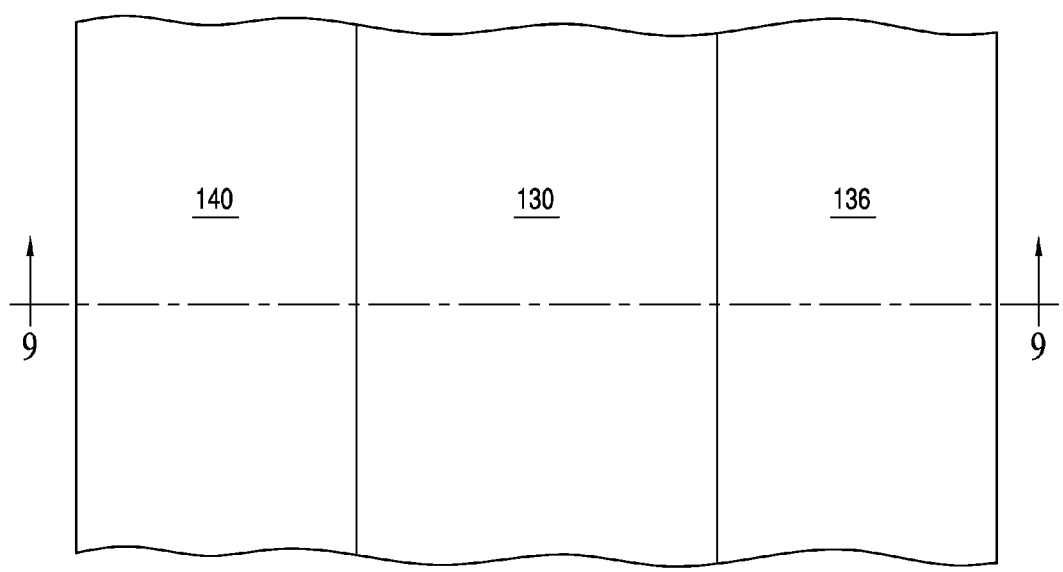
FIG. 7A is a plan view of a film made using the extrusion head of FIG. 7.

A feedblock is illustrated in FIG. 7. There, a feedblock 110 includes three openings 112, 114, 116 laterally spaced by spacers 122, 124 and bounded above and below by a top 140 and a bottom 142. In use, the oxygen absorber-containing composition is extruded through opening 114 and the transparent polymers are co-extruded through the openings 112, 116 to form a sheet containing an oxygen-absorbing strip 130 located transversely between two transparent strips 134, 136, such as shown in FIG. 7A. FIGS. 7 and 7A are not to scale.

Figure 8:
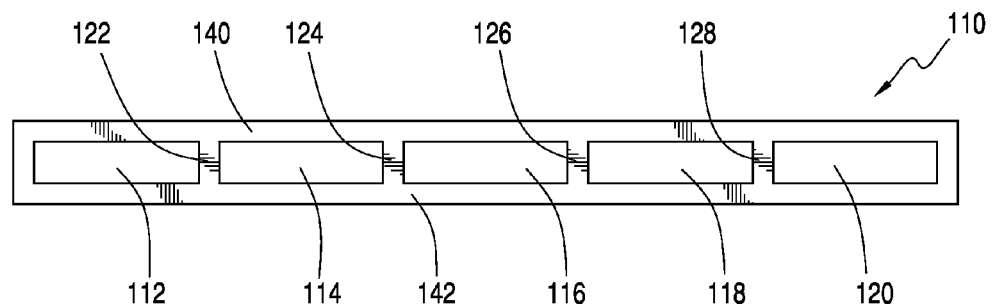
FIG. 8 is an elevation view of an extrusion head suitable for creating a film according to one aspect of the invention.
Figure 8A:
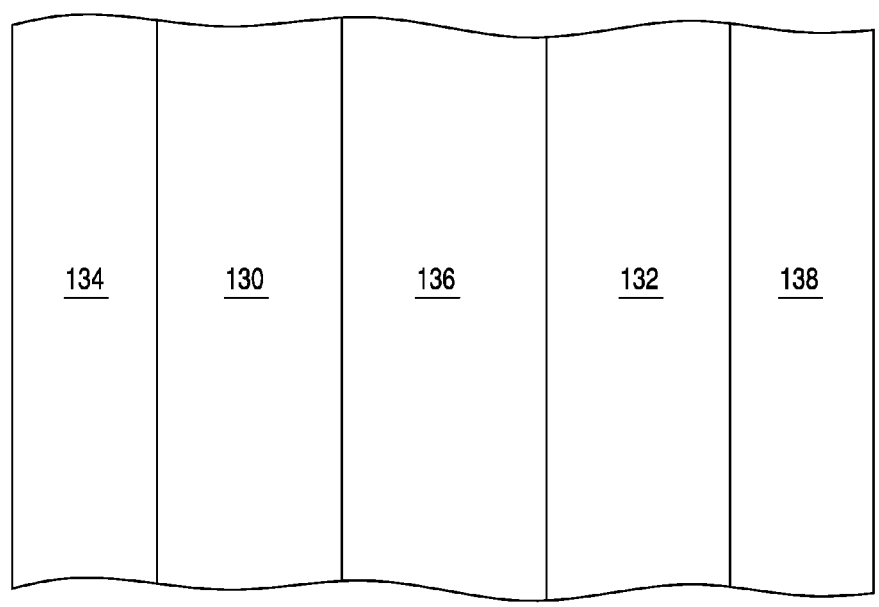
FIG. 8A is a plan view of a film made using the extrusion head of FIG. 8.

FIG. 8 shows an alternative feedblock 110, substantially identical to that of FIG. 7, except it includes additional openings 118, 120, and spacers 126, 128. An extrusion head employing this feedblock results in a film such as shown in FIG. 8A having three transparent strips 134, 136, 138 and two oxygen-absorbing strips 130, 132, which is similar to the film illustrated in FIGS. 1-3. As noted above, outer layers, such as those designated as reference numerals 27 and 31 in FIGS. 2 and 2A may be co-extruded with the striped layer, or may be laminated after extrusion.

Figure 9:
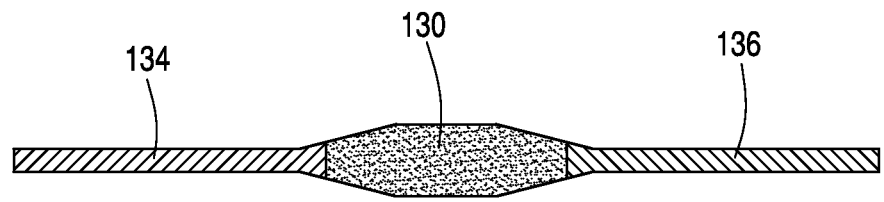
FIG. 9 is a cross-sectional view taken along line 9-9 in FIG. 7A.

Although the inventor has used feedblocks such as those illustrated in FIGS. 7 and 8, he has found that because of viscosity differences between the transparent polymers and the oxygen-absorbent material that openings having the same height "h" as those shown in those figures result in a film having a non-uniform thickness. Specifically, the illustrated feedblocks 110 result in thicker oxygen-absorbing strips than transparent areas. An observed cross-section of a film formed using a head 110 of FIG. 7 is illustrated in FIG. 9. As shown, the center of the oxygen-absorbing strip 130 is thicker in the middle, and narrows at the junction with each of the transparent strips 134, 136, which in turn narrow further out to their edges. In one application, the film was as thick as 3.5 mil at the center and as narrow as 2 mil nearer the edges. This difference is extremely noticeable upon winding several thousand feet of the film on a roll.

Figure 10:
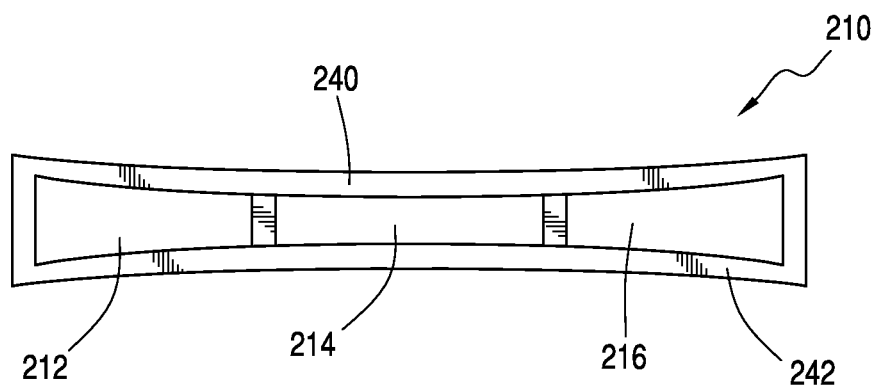
FIG. 10 is an elevation view of an extrusion head suitable for creating a film according to one aspect of the invention.

A preferred feedblock 210 is illustrated in FIG. 10. The feedblock 210 is substantially identical to that illustrated in FIG. 7, except top 240 and bottom 242 are arcuate instead of planar. Accordingly, the height of central opening 214 varies along the transverse direction, i.e., between openings 212, 216. The respective heights of openings 212, 216 also vary with width, being larger at the edges of the feedblock 210. The arc of the top and bottom may be calculated to ensure a substantially uniform thickness across the film, based on the materials (and their viscosities) to be extruded. Thus, a different head is used for each combination of extruded materials.

Figure 11:
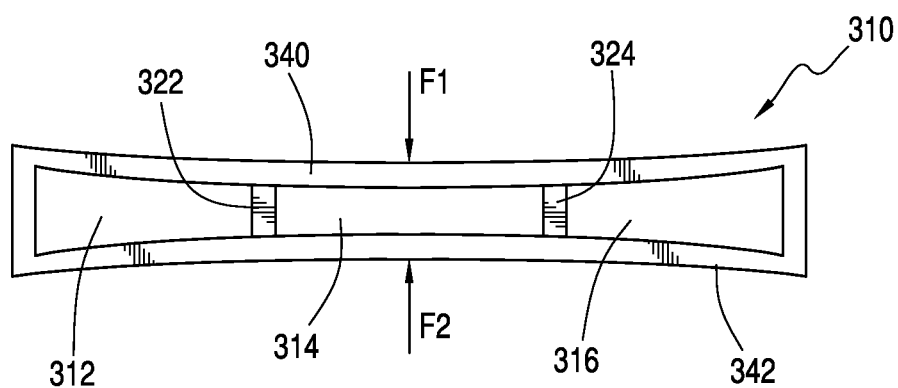
FIG. 11 is an elevation view of an extrusion head suitable for creating a film according to one aspect of the invention.

In another embodiment, the height of the openings, i.e., the distances between the top and bottom are adjustable. Such an adjustable feedblock 310 is illustrated in FIG. 11. There, the top 340 and the bottom 342 are deformable upon application of a force along arrows F1 and F2, respectively. As illustrated, both the top and bottom are fixed at lateral ends and deformed to contact spacers 322, 324, creating an arcuate shape above and below the openings 312, 314, 316. The spacers may be sized for the application, that is, such that sufficient force is provided to result in contact of the spacers by the top and bottom. Alternatively, the spacers may also be deformable under the forces F1 and F2. In an application in which more openings are provided, it may be desirable to provide additional forces on any openings that will pass the oxygen-absorbing material therethrough. The forces may be applied using any known methodologies, although the force is preferably controllable by the user to fine-tune the size of the opening. In one example, set screws may be provided outside the extrusion head that are selectively turned to apply a desired force. Other arrangements will be appreciated by those of ordinary skill in the art.

In an embodiment similar to that of FIG. 11, the deformable top and bottom may be fixed to the spacers, such that a force applied along arrows F1 and F2 will only create a curvature in the central opening 314.

Although only oxygen absorber has been discussed as an additive to the bands, it is possible to utilize other additive with the iron particles, in the inner layer of the packaging sheet or other layers. Additives such as biocides and fungicides could be combined with the polymer of these or other layers. Brighteners could be added to the layers or to the printing layers. Colorants also could be used to give the transparent areas a color or tint to improve the look of the product in the bag or pouch.

The following examples are illustrative and not exhaustive of the invention. Parts and percentages are by weight unless otherwise indicated.

EXAMPLE 1

A film is formed comprising three layers of: low-density polyethylene/polyethylene (70%)+reduced iron coated with activating and acidifying material (30%)/low-density polyethylene to make a 3 to 4 mil thick film with a width of 9 inch. The coated iron is about 12 to 18% by weight with respect to the film if it were spreading across the width of the film. The coated iron is located in the middle layer of the band which is centered in the film and is approximately 4 inch wide. The net coated iron content in film can be approximated by multiplying the feed content by the ratio of the band width with respect to the full width of the film. The oxygen scavenging performance of the band film was tested by using a pouch test method. Sample films were heat laminated onto a high gas barrier clear PET substrate. The laminated film and the substrates were heat sealed to form a 7"×7" pouch with the 4 inch band portion located in the middle of the pouch with approximately 1.5 inch clear window on each side of the band. The net coated iron content as determined by the ratio of the band width with respect to the pouch width was 6.86 and 10.29%. Ten grams of moisture regulator made of silica gel granules and water with a water activity of 0.85 was sealed in Tyvek bag and put in the pouch prior to the final seal of the pouch. The bag was injected with 300 cc of $O_2/N_2$ mixture to achieve a starting oxygen level of approximately 4-4.5%. The oxygen absorption rate was measured using a MOCON PacCheck Model 450 Head Space Analyzer at various times at room temperature. The oxygen absorbed by the samples at these times is shown in Table-1. The data demonstrated that both the high and lower contents of the coated iron extruded in films in band form provide oxygen scavenging performance. The concentration of oxygen in the pouch decreased rapidly with time.

TABLE 1

Oxygen absorption of the band films containing coated iron

| Pouch sample | Film gauge mil | Coated iron content in pouch % | O2 Absorption Test time, hrs | O2 conc, % |
|---|---|---|---|---|
| 1 | 4 | 6.86 | 0 | 4.25 |
|   |   |   | 24 | 2.85 |
|   |   |   | 72 | 0.336 |
| 2 | 3.5 | 10.29 | 0 | 4.38 |
|   |   |   | 24 | 2.254 |
|   |   |   | 72 | 0.0236 |

This example demonstrated that the band film containing coated iron can be used to make printed food bags as a sealant film. An example can be that a polyethylene terephthalate (PET) printed polyethylene terephthalate barrier film multilayer substrate of 1.5 mil that is printed except that it contains a 4"×2" not printed clear window is formed every 8 inches. The multilayer printed substrate has the structure: PET/print/adhesive/PET. The multilayer substrate is the laminated onto the oxygen scavenger containing film. Blanks for packaging each containing a window are cut from the laminated sheet and folded to make bags that have a clear window such as in FIG. 6. The bag is utilized for beef jerky packaging. After two weeks the bag is tested and found to have an oxygen level of less than 0.2% as compared to an initial oxygen level of 5% at the time of packaging.

EXAMPLE 2

The bag of example 1 is compared with a conventional beef jerky package that has a label containing oxygen scavenger. The package material having the banded oxygen absorber in the continuous sheet was found to be as effective as the oxygen absorbing labels conventionally used on the inside of the package.

The invention claimed is:
1. A method of forming a sheet comprising:
   extruding a first material comprising an oxygen absorber; and
   co-extruding a second material transversely adjacent to the first material, the second material being free of an oxygen absorber.
2. The method of claim 1, the second material being substantially transparent after co-extruding.
3. The method of claim 1, further comprising printing a print at least partially covering the first material.
4. The method of claim 1, the first material further comprising a polymer.
5. The method of claim 1, the extruding the first material and the co-extruding the second material forming a first layer, and the method further comprising:
   forming a second layer on the first layer.
6. The method of claim 5, the forming the second layer on the first layer comprising co-extruding the second layer with the first layer.
7. The method of claim 5, the forming the second layer on the first layer comprising laminating the second layer on the first layer.
8. The method of claim 5, the second layer comprising a homogeneous layer of polymer.
9. The method of clam 5, the second layer comprising an oxygen barrier layer.
10. The method of claim 1, the extruding the first material comprising extruding the first material through a first opening in a feedblock and the co-extruding the second material comprising extruding the second material through a second opening in the feedblock.
11. The method of claim 10, a height of the first opening at least at a portion of the first opening being greater than a height of the second opening at least at a portion of the second opening.
12. The method of claim 11, the height of the first opening varying along a transverse direction of the opening.
13. A method comprising:
   co-extruding an oxygen scavenging material transversely adjacent to a non-oxygen scavenging material to form a first layer;
   forming a second layer on the first layer; and
   forming an oxygen barrier layer on a side of the first layer opposite the second layer.
14. The method of claim 13, wherein the forming the second layer on the first layer comprises co-extruding the first layer with the second layer.
15. The method of claim 13, wherein the forming the oxygen barrier layer comprises providing a tie layer between the first layer and the oxygen barrier layer.
16. A method comprising:
   providing a multi-layer blank including, in a single layer, at least one first area including an oxygen scavenging material dispersed in a polymer and at least one second area transversely adjacent the first area, the second area being free of the oxygen scavenging material; and forming the blank into a package.

17. The method of claim 16, wherein the multi-layer blank further comprises an oxygen barrier layer.

18. The method of claim 16, the first area and the second area comprising adjacent bands.

19. The method of claim 16, further comprising filling the package.

20. The method of claim 16, the blank further including a printing covering at least a portion of the at least one first area.

* * * * *